US010570821B2

(12) United States Patent
Shershnyov et al.

(10) Patent No.: US 10,570,821 B2
(45) Date of Patent: Feb. 25, 2020

(54) PRE-FILM LIQUID FUEL CARTRIDGE

(71) Applicants: General Electric Company, Schenectady, NY (US); Borys Borysovych Shershnyov, Moscow (RU); Alexey Yurievich Gerasimov, Moscow (RU)

(72) Inventors: Borys Borysovych Shershnyov, Moscow (RU); Alexey Yurievich Gerasimov, Moscow (RU)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 741 days.

(21) Appl. No.: 15/129,899

(22) PCT Filed: Apr. 4, 2014

(86) PCT No.: PCT/RU2014/000251
§ 371 (c)(1),
(2) Date: Sep. 28, 2016

(87) PCT Pub. No.: WO2015/152760
PCT Pub. Date: Oct. 8, 2015

(65) Prior Publication Data
US 2017/0159561 A1 Jun. 8, 2017

(51) Int. Cl.
*F02C 3/30* (2006.01)
*F23R 3/34* (2006.01)
(Continued)

(52) U.S. Cl.
CPC ............... *F02C 3/30* (2013.01); *F02C 7/141* (2013.01); *F23D 11/16* (2013.01); *F23R 3/28* (2013.01); *F23R 3/286* (2013.01); *F23R 3/343* (2013.01)

(58) Field of Classification Search
CPC .... F02C 3/30; F02C 7/41; F23D 11/16; F23D 11/107; F23R 3/14; F23R 3/28; F23R 3/283; F23R 3/286; F23R 3/343
(Continued)

(56) References Cited

U.S. PATENT DOCUMENTS 6,547,163 B1 4/2003 Mansour et al.
7,669,420 B2 3/2010 Spooner
(Continued)

FOREIGN PATENT DOCUMENTS

EP 2 549 183 A1 1/2013
JP H10-33421 A 2/1998
(Continued)

OTHER PUBLICATIONS

Office Action and Search issued in connection with corresponding RU Application No. 2016138814 dated Feb. 8, 2018.
(Continued)

*Primary Examiner* — Mark A Laurenzi
*Assistant Examiner* — Loren C Edwards
(74) *Attorney, Agent, or Firm* — Dority & Manning, P.A.

(57) ABSTRACT

A pre-film liquid fuel cartridge includes a main body having a water passage, a liquid fuel passage, a compressed air passage and a pre-film tip disposed at a downstream portion of the pre-film liquid fuel cartridge. The pre-film tip includes a forward end portion that is axially separated from an aft end portion and an inner side that extends therebetween. The inner side at least partially defines a pre-filming surface which terminates at an emulsion atomizing shear edge. The pre-film tip includes a plurality of water injection ports oriented tangentially through the pre-filming surface, a plurality of liquid fuel injection ports oriented tangentially through the pre-filming surface and a plurality of atomizing air injection ports axially oriented around the emulsion
(Continued)

atomizing shear edge. An atomizing air shear edge is defined downstream from the emulsion atomizing shear edge and the atomizing air injection ports.

18 Claims, 6 Drawing Sheets

(51) Int. Cl.
  *F23R 3/28* (2006.01)
  *F02C 7/141* (2006.01)
  *F23D 11/16* (2006.01)
(58) Field of Classification Search
  USPC ........................................................ 60/39.54
  See application file for complete search history.

(56) References Cited

U.S. PATENT DOCUMENTS

| | | | |
|---|---|---|---|
| 8,146,365 B2* | 4/2012 | Shum | F23D 11/108 60/740 |
| 2009/0255258 A1 | 10/2009 | Bretz et al. | |
| 2010/0300102 A1* | 12/2010 | Bathina | F23R 3/12 60/737 |
| 2010/0308135 A1 | 12/2010 | Yamamoto et al. | |
| 2012/0291447 A1 | 11/2012 | Boardman et al. | |

FOREIGN PATENT DOCUMENTS

| | | |
|---|---|---|
| RU | 2 404 848 C2 | 11/2010 |
| RU | 2404848 C2 | 11/2010 |
| WO | 2013/115671 A1 | 8/2013 |
| WO | WO 2013/115671 | 8/2013 |

OTHER PUBLICATIONS

Decision to Grant issued in connection with corresponding RU Application No. 2016138814 dated May 22, 2018.
PCT/RU2014/000251 International Search Report dated Apr. 12, 2014.

* cited by examiner

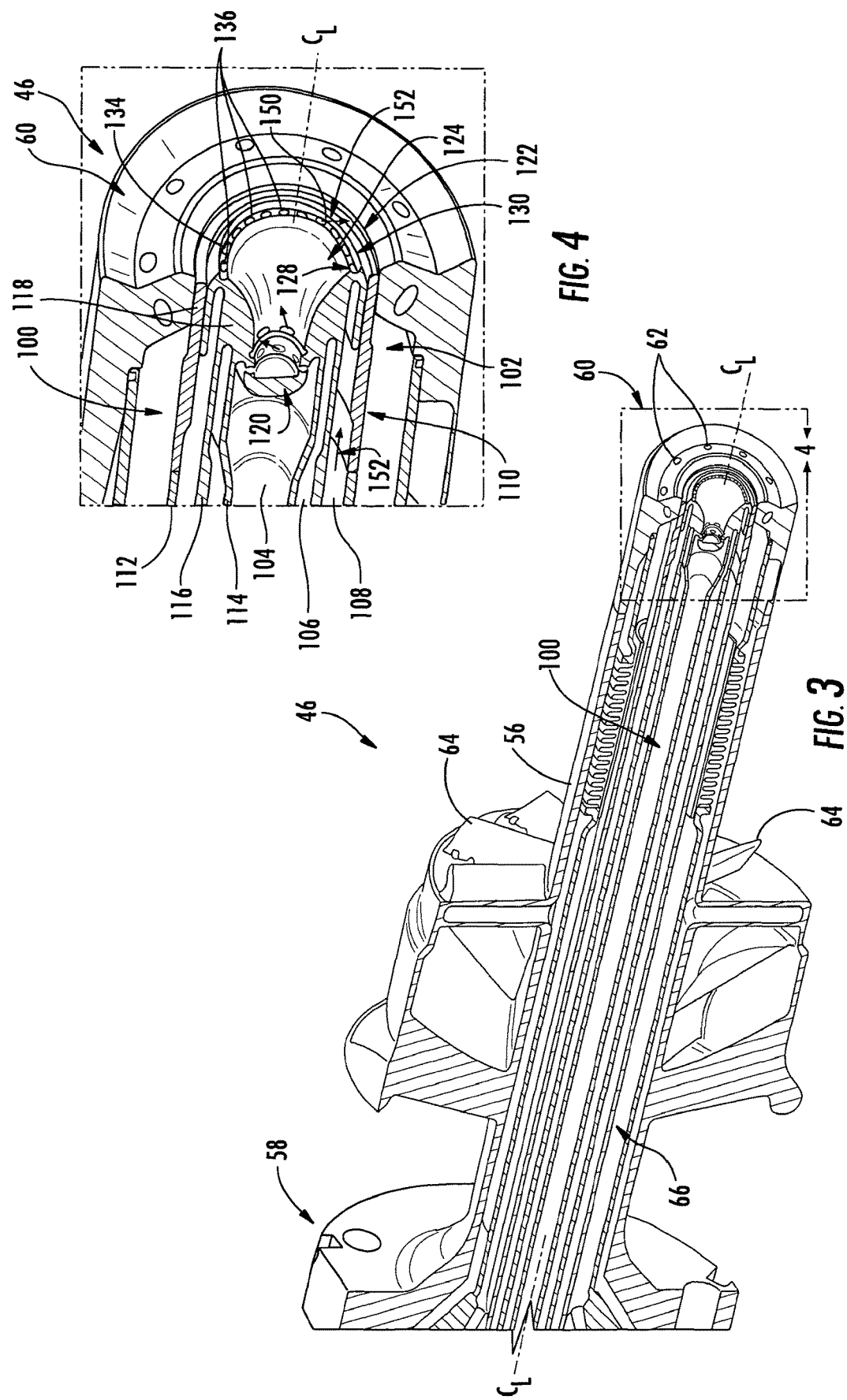

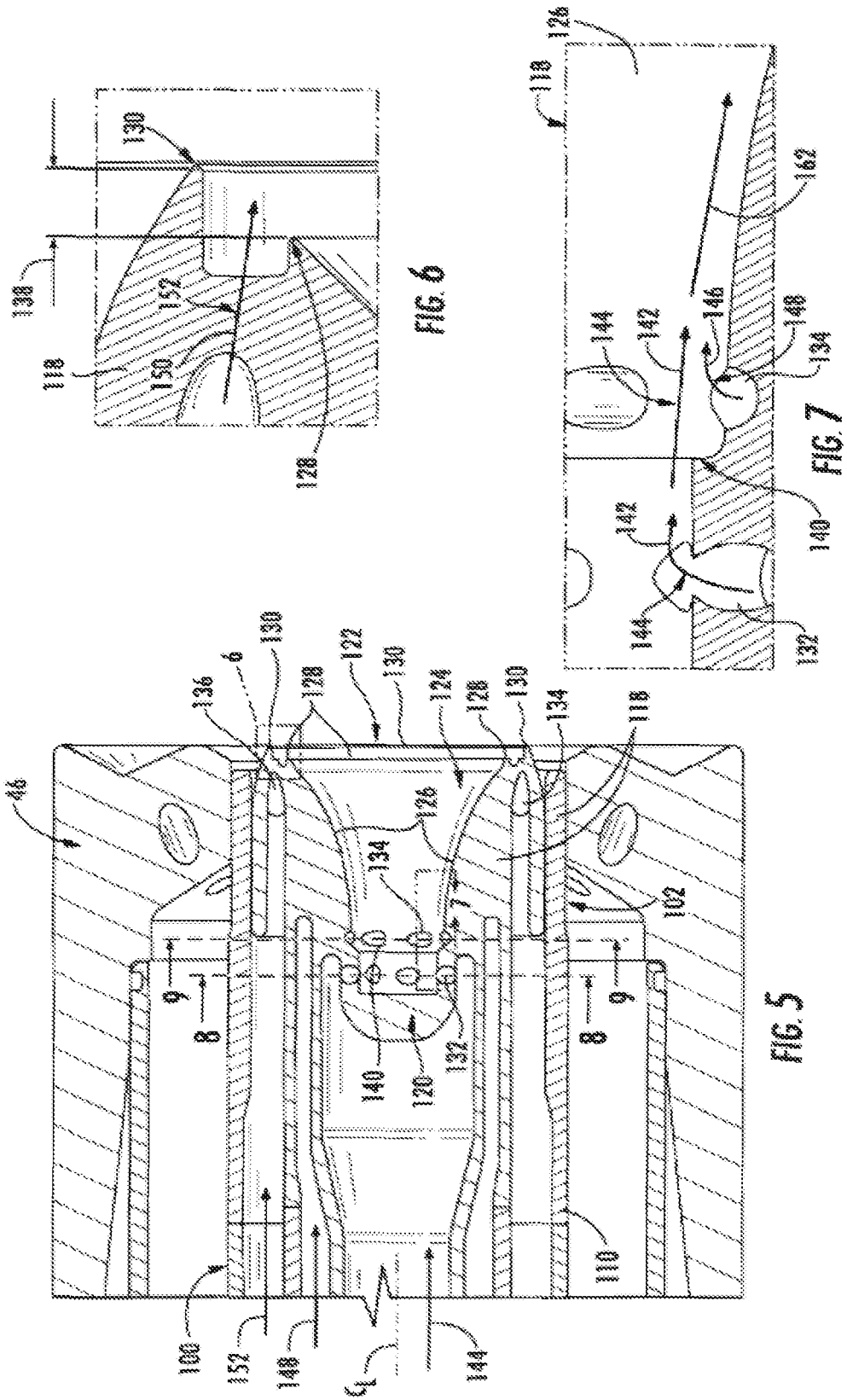

US 10,570,821 B2

PRE-FILM LIQUID FUEL CARTRIDGE

FIELD OF THE INVENTION

The present invention generally involves a pre-film liquid fuel cartridge for a combustor of a gas turbine. Specifically, the invention relates to a pre-film liquid fuel cartridge having a common pre-film surface for water and liquid fuel multi-layer injection.

BACKGROUND OF THE INVENTION

A combustor for a gas turbine may be configured or designed to combust liquid fuels, gaseous fuels or both within a combustion chamber. Pre-filming air-blast liquid fuel injectors for issuing atomized liquid fuel into the combustion chamber of the combustor are well known in the art. In this type of fuel injector, fuel is spread out into a thin continuous sheet and then subjected to a stream of atomizing air.

In one configuration, the atomizing air flows through concentric air swirl passages that generate separate swirling airflows at the nozzle exit. At the same time, liquid fuel flows through a plurality of circumferentially arranged ports and then onto a single or common pre-filming surface where it spreads out into a thin uniform sheet before being discharged from the edge of the pre-filming surface into the cross-flowing air stream. When the fuel is injected into the combustion chamber for combustion, high temperature regions are formed locally in the combustion gas, which increase NOx emissions. The enhanced mixing of the fuel-air combination from the fuel nozzle with the swirling fuel-air mixture in the combustion chamber reduces peak flame temperature within the combustion chamber, thereby reducing NOx emission levels. In addition, water may be injected into the combustion chamber to further reduce the flame temperature, thus further reducing NOx emissions levels.

The use of atomizing air to shear the liquid fuel reduces the volume of air that is utilized for other purposes such as cooling the combustor and/or other parts of the gas turbine, thereby affecting the overall efficiency of the gas turbine. In addition, a large volume of water must be supplied at a sufficiently high pressure in order to have sufficient kinetic energy to interact with the fuel and the atomizing air. This requires high pressure pumps which may also affect the overall efficiency of the gas turbine. Furthermore, use of the atomizing air to atomize the liquid fuel may result in relatively large droplets of fuel that may collect or wet on an inner surface of the combustion liner, and/or along a thermal barrier coating that is typically disposed along the inner surface. Therefore, an improved pre-film liquid fuel cartridge for a combustor of a gas turbine would be useful.

BRIEF DESCRIPTION OF THE INVENTION

Aspects and advantages of the invention are set forth below in the following description, or may be obvious from the description, or may be learned through practice of the invention.

One embodiment of the present invention is a pre-film liquid fuel cartridge. The pre-film liquid fuel cartridge includes a main body, a water passage defined within the main body, a liquid fuel passage defined within the main body, a compressed air passage defined within the main body and a pre-film tip that is disposed at a downstream portion of the pre-film liquid fuel cartridge. The pre-film tip includes an upstream or forward end portion that is axially separated from an aft or downstream end portion and an inner side that extends therebetween. The inner side defines a pre-filming surface that terminates at an emulsion atomizing shear or sharp edge. The pre-film tip also includes a plurality of water injection ports that are oriented tangentially with respect an axial centerline of the pre-film liquid fuel cartridge. The water injection holes extend through the pre-filming surface proximate to the forward end portion and are fluid communication with the water passage. A plurality of liquid fuel injection ports is oriented tangentially through the pre-filming surface between the liquid fuel injection ports and the emulsion atomizing shear or sharp edge. The liquid fuel injection ports are in fluid communication with the liquid fuel passage. A plurality of atomizing air injection ports is axially oriented around the emulsion atomizing shear or sharp edge. The atomizing air injection ports are in fluid communication with the compressed air passage. An atomizing air shear edge is defined radially outwardly from the atomizing air injection ports downstream from the emulsion atomizing shear edge.

Another embodiment of the present disclosure is a pre-film liquid fuel cartridge. The pre-film liquid fuel cartridge includes a water passage defined within a main body, a liquid fuel passage defined within the main body radially outwardly from the water passage, a compressed air passage defined within the main body radially outwardly from the water passage and a pre-film tip that is disposed at a downstream portion of the pre-film liquid fuel cartridge. The pre-film tip includes a forward or upstream end portion that is axially separated from an aft or downstream end portion and an inner side that extends therebetween. The inner side defines a pre-filming surface that terminates at an emulsion atomizing shear or sharp edge. The pre-film tip also includes a plurality of upstream air injection ports that are oriented tangentially through the pre-filming surface proximate to the forward end portion and that are in fluid communication with the compressed air passage. A plurality of water injection ports is oriented tangentially through the pre-filming surface downstream from the upstream air injection ports. The water injection ports are in fluid communication with the water passage. A plurality of liquid fuel injection ports is oriented tangentially inwardly through the pre-filming surface between the water injection ports and the emulsion atomizing shear or sharp edge. The liquid fuel injection ports are in fluid communication with the liquid fuel passage. The pre-film tip further includes a plurality of atomizing air injection ports that are axially oriented around the emulsion atomizing shear or sharp edge and that are in fluid communication with the compressed air passage. An atomizing air shear edge is defined radially outwardly from the atomizing air injection ports downstream from the emulsion atomizing shear edge.

Another embodiment of the present disclosure includes a gas turbine. The gas turbine includes a compressor, a combustor disposed downstream from the compressor and a turbine that is disposed downstream from the combustor. The combustor includes a fuel nozzle that extends downstream from an end cover and that defines a fuel cartridge passage within the combustor. A pre-film liquid fuel cartridge extends within the fuel cartridge passage. The pre-film liquid fuel cartridge includes a main body, a water passage defined within the main body, a liquid fuel passage defined within the main body, a compressed air passage defined within the main body and a pre-film tip disposed at a downstream portion of the pre-film liquid fuel cartridge proximate to an end portion of the fuel nozzle. The pre-film tip includes a forward or upstream end portion that is axially separated from an aft or downstream end portion and an inner side that extends therebetween. The inner side defines an arcuate pre-filming surface that terminates at an emulsion atomizing shear or sharp edge. The pre-film tip also includes a plurality of water injection ports that are oriented tangentially through the pre-filming surface proximate to the forward end portion and that are in fluid communication with the water passage. A plurality of liquid fuel injection ports is oriented tangentially through the pre-filming surface between the water injection ports and the emulsion atomizing shear or sharp edge and is in fluid communication with the liquid fuel passage. A plurality of atomizing air injection ports is axially oriented around the emulsion atomizing shear or sharp edge and is in fluid communication with the compressed air passage. An atomizing air shear edge is defined radially outwardly from the atomizing air injection ports downstream from the emulsion atomizing shear edge.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which:

FIG. 3 is a partial cross sectional perspective view of an exemplary fuel nozzle including a pre-film liquid fuel cartridge according to one embodiment of the present invention;

FIG. 4 is an enlarged perspective view of an end portion of the fuel nozzle as shown in FIG. 3 including a downstream end portion of the pre-film liquid fuel cartridge, according to one embodiment of the present invention;

FIG. 5 is an enlarged cross sectional side view of the end portion of the fuel nozzle including the downstream end portion of the pre-film liquid fuel cartridge according to one embodiment of the present invention;

FIG. 6 is an enlarged view of a portion of the pre-film tip as shown in FIG. 5, according to one or more embodiments of the present invention;

FIG. 7 is an enlarged view of a portion of the pre-film tip as shown in FIG. 5, according to one or more embodiments of the present invention;

DETAILED DESCRIPTION OF THE INVENTION

Figure 1:
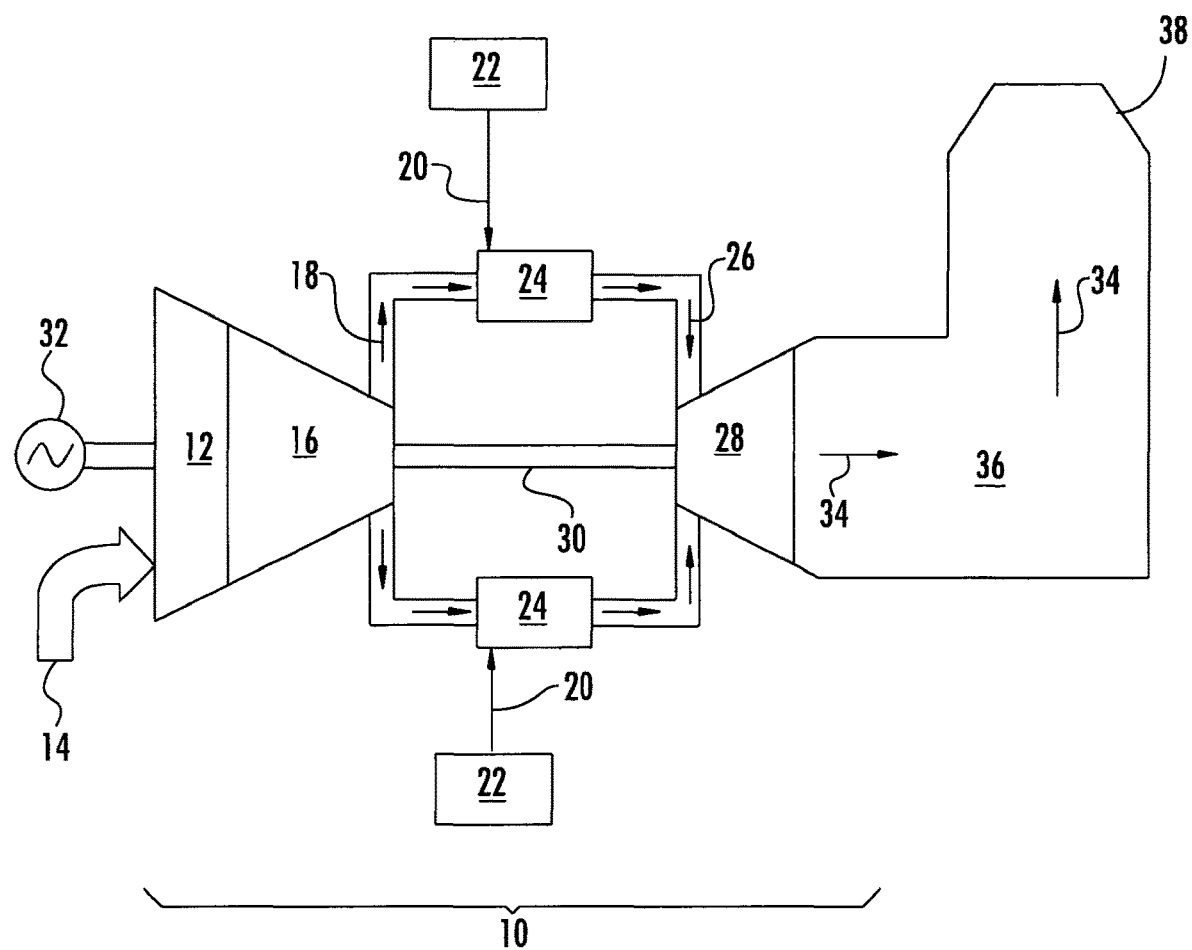
FIG. 1 is a functional block diagram of an exemplary gas turbine that may incorporate various embodiments of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, and the term "axially" refers to the relative direction that is substantially parallel to an axial centerline of a particular component.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Although exemplary embodiments of the present invention will be described generally in the context of a pre-film liquid fuel cartridge incorporated into a combustor of an industrial gas turbine for purposes of illustration, one of ordinary skill in the art will readily appreciate that embodiments of the present invention may be applied to any combustor incorporated into any turbomachine such as a marine or aircraft gas turbine and are not limited to an industrial gas turbine combustor unless specifically recited in the claims.

Referring now to the drawings, wherein identical numerals indicate the same elements throughout the figures, FIG. 1 provides a functional block diagram of an exemplary gas turbine 10 that may incorporate various embodiments of the present invention. As shown, the gas turbine 10 generally includes an inlet section 12 that may include a series of filters, cooling coils, moisture separators, and/or other devices to purify and otherwise condition a working fluid (e.g., air) 14 entering the gas turbine 10. The working fluid 14 flows to a compressor section where a compressor 16 progressively imparts kinetic energy to the working fluid 14 to produce a compressed working fluid 18.

The compressed working fluid 18 is mixed with a fuel 20 from a fuel source 22 such as a fuel skid to form a combustible mixture within one or more combustors 24. The combustible mixture is burned to produce combustion gases 26 having a high temperature, pressure and velocity. The combustion gases 26 flow through a turbine 28 of a turbine section to produce work. For example, the turbine 28 may be connected to a shaft 30 so that rotation of the turbine 28 drives the compressor 16 to produce the compressed working fluid 18. Alternately or in addition, the shaft 30 may connect the turbine 28 to a generator 32 for producing electricity. Exhaust gases 34 from the turbine 28 flow through an exhaust section 36 that connects the turbine 28 to an exhaust stack 38 that is downstream from the turbine 28. The exhaust section 36 may include, for example, a heat recovery steam generator (not shown) for cleaning and extracting additional heat from the exhaust gases 34 prior to release to the environment.

Figure 2:
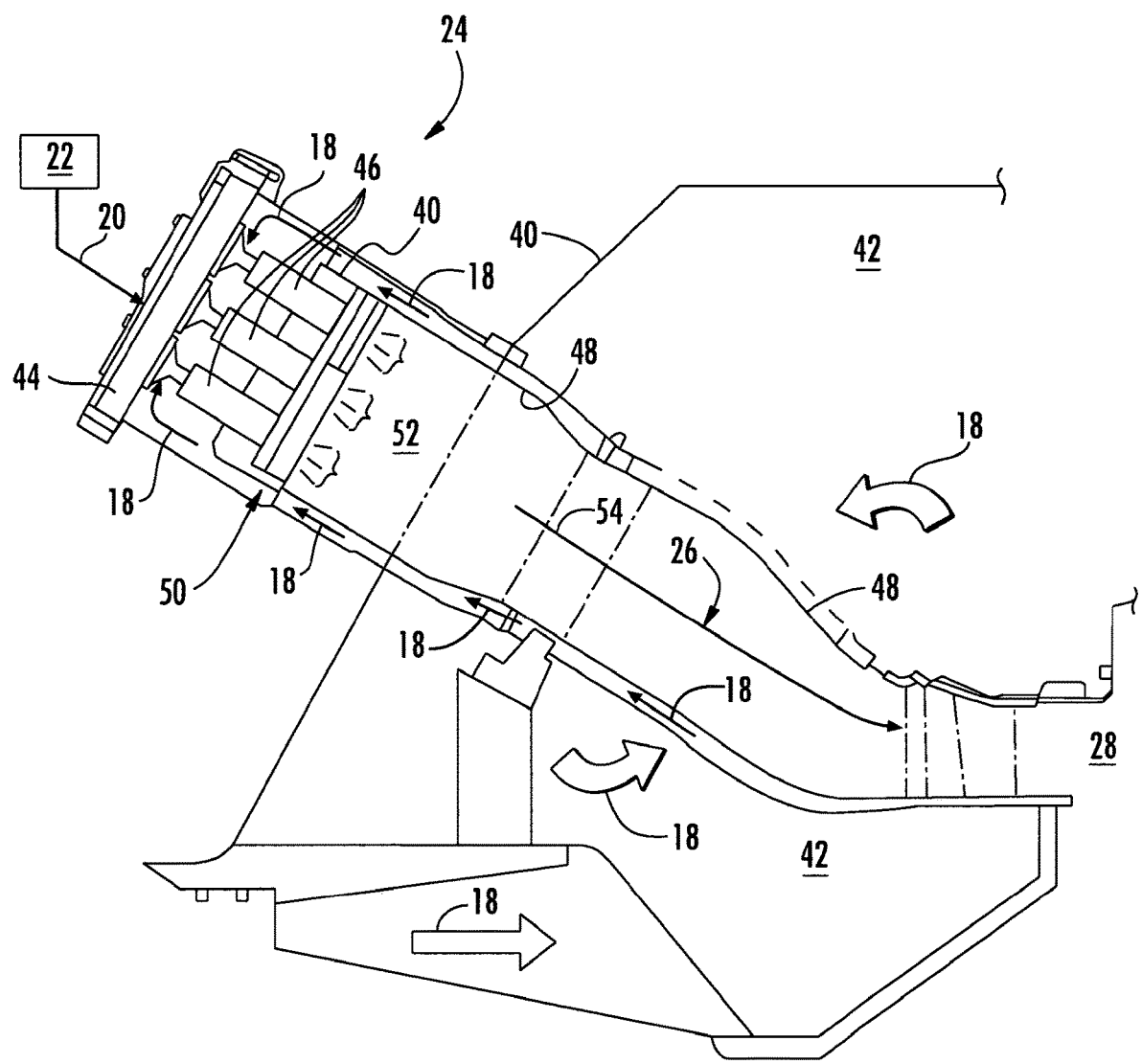
FIG. 2 is a simplified cross-section side view of an exemplary combustor as may incorporate various embodiments of the present invention.

FIG. 2 provides a simplified cross section of an exemplary combustor 24 as may incorporate various embodiments of the present invention. As shown, the combustor 24 is at least partially surrounded by an outer casing 40. The outer casing 40 at least partially forms a high pressure plenum 42 around the combustor 24. The high pressure plenum 42 may be in fluid communication with the compressor 16 or other source for supplying the compressed working fluid 18 to the combustor 24. In one configuration, an end cover 44 is coupled to the outer casing 40. The end cover 44 may be in fluid communication with the fuel supply 22.

As shown in FIG. 2, at least one fuel nozzle 46 extends downstream from the end cover 44 in a substantially axial direction with respect to an axial centerline of the combustor 24. The fuel nozzles 46 receive fuel 20 directly from the fuel supply 22 and/or via the end cover 44. One end of an annular liner 48 such as a combustion liner and/or a transition duct surrounds a downstream end 50 of the fuel nozzles 46 to at least partially define a combustion chamber 52 within the combustor 24. The liner 48 at least partially defines a hot gas path 54 for directing the combustion gases 26 from the combustion chamber 52 through the combustor 24. For example, the hot gas path 54 may be configured to route the combustion gases 26 towards the turbine 28 and/or the exhaust section 36 (FIG. 1).

FIG. 3 is a cross sectional perspective view of an exemplary fuel nozzle 46 according to one embodiment of the present invention. As shown in FIG. 3, the fuel nozzle 46 generally includes a tube or conduit 56 that extends axially between an upstream end portion 58 and a downstream end or tip portion 60. The upstream end portion 58 may be configured to connect to the end cover 44 via a flange and/or one or more fastener holes. The downstream end portion 60 of the fuel nozzle 46 may include a plurality of annularly arranged fuel ports 62.

In particular embodiments the fuel nozzle 46 may include a plurality of swirler vanes 64 that extend radially outwardly and axially with respect to an axial centerline of the fuel nozzle 46. The swirler vanes 64 provide axial or angular swirl to the compressed air 18 from the high pressure plenum 42 (FIG. 2), thus enhancing mixture of the compressed air 18 with a fuel such as a gas or liquid fuel from the fuel supply 22 upstream from the combustion chamber 52. In various embodiments, as shown in FIG. 3, the tube or conduit 56 at least partially defines a fuel cartridge passage 66 that extends axially through the fuel nozzle 46.

In particular embodiments, a pre-film liquid fuel cartridge 100 is disposed within the liquid fuel cartridge passage 66. The end cover 44 may at least partially define the fuel cartridge passage 66. In this manner, the pre-film liquid fuel cartridge 100 may be breach loaded into the fuel cartridge passage 66 via the end cover 44.

FIG. 4 provides a partial cross sectional perspective view of the tip portion 60 of the fuel nozzle 46 as shown in FIG. 3 including a downstream end portion 102 of the pre-film liquid fuel cartridge 100 according to one embodiment of the present invention. FIG. 5 is an enlarged cross sectional side view of the tip portion 60 of the fuel nozzle 46 including the downstream end portion 102 of the pre-film liquid fuel cartridge 100 as show in FIG. 4, according to one embodiment of the present invention. As shown in FIG. 4, the downstream end portion 102 of the pre-film liquid fuel cartridge 100 extends at least partially through the tip portion 60 of the fuel nozzle 46 to provide for fluid communication into the combustion chamber 52 (FIG. 2).

In one embodiment, as shown in FIG. 4, the pre-film liquid fuel cartridge 100 includes a water passage 104, a liquid fuel passage 106 and a compressed air passage 108, each defined within a main body 110. The water passage 104 is in fluid communication with a water supply and/or a diluent supply, the liquid fuel passage 106 is in fluid communication with a liquid fuel supply and the compressed air passage 108 is in fluid communication with a compressed air supply. The main body 110 may be at least partially defined by an outer conduit or tube 112. The outer tube 112 may be substantially cylindrical.

In one embodiment, the water passage 104 is at least partially defined by an inner tube or conduit 114 disposed within the main body 110. The inner tube 114 is coaxially aligned with an axial centerline of the pre-film liquid fuel cartridge 100 and is in fluid communication with the water supply and/or the diluent supply. The liquid fuel passage 106 is at least partially defined by an intermediate tube or conduit 116 that is disposed within the main body 110 and that circumferentially surrounds the inner tube 114. The intermediate tube 116 is radially separated from the inner tube 114 so as to define the liquid fuel passage 106 therebetween radially outwardly from the water passage 104. The intermediate tube 116 is in fluid communication with a liquid fuel supply. The compressed air passage 108 is at least partially defined by the outer tube 112. The outer tube 112 circumferentially surrounds the intermediate tube 116. The outer tube 112 is radially separated from the intermediate tube 116 so as to define the compressed air passage 108 therebetween radially outwardly from the water passage 104 and/or the liquid fuel passage 106. The outer tube 112 is in fluid communication with the compressed air supply.

In particular embodiments, as shown in FIGS. 4 and 5, the pre-film liquid fuel cartridge 100 includes a pre-film tip 118 disposed at the downstream portion 102 of the main body 110 and/or the pre-film liquid fuel cartridge 100. The pre-film tip 118 includes a forward end portion 120 that is axially separated from an aft end portion 122. The pre-film tip 118 further includes an inner side 124 that extends at least partially between the forward end portion 120 and the aft end portion 122. The inner side 124 at least partially defines a pre-filming surface 126 of the pre-film tip 118. In one embodiment the pre-filming surface. 126 is arcuate. For example, the pre-filming surface 126 may be convex or bell shaped. In one embodiment, the pre-filming surface 126 terminates at an emulsion atomizing shear or sharp edge 128 that is defined proximate to the aft end portion 122. The aft end portion 122 terminates at an atomizing air shear or sharp edge 130.

In one embodiment, as shown in FIG. 5, the pre-film tip 118 includes a plurality of water or diluent injection ports 132, a plurality of liquid fuel injection ports 134 and a plurality of atomizing air injection ports 136. FIG. 6 is an enlarged view of a portion of the pre-film tip 118 as shown in FIG. 5, illustrating a portion of the emulsion atomizing shear edge 128, a portion of the atomizing air shear edge 130 and an exemplary atomizing air injection port 136 according to one or more embodiments. As shown in FIG. 6, an axial gap or offset 138 is defined between the emulsion atomizing shear edge 128 and the atomizing air shear edge 130. The emulsion atomizing shear edge 128 is disposed radially inwardly from the plurality of atomizing air injection ports 136.

FIG. 7 is an enlarged view of a portion of the pre-film tip 118 as shown in FIG. 5, illustrating a cutaway view of an exemplary water/diluent injection port 132, and an exemplary liquid fuel injection port 134 according to one or more embodiments. As shown in FIGS. 5 and 7, a ledge or step 140 is defined along a portion of the inner side 124. In one embodiment, the ledge or step 140 is defined by the inner side 124 and extends radially and circumferentially around the inner side 124. The ledge or step 140 is disposed downstream from the water injection ports 132 and upstream from the liquid fuel injection ports 134.

Figure 8:
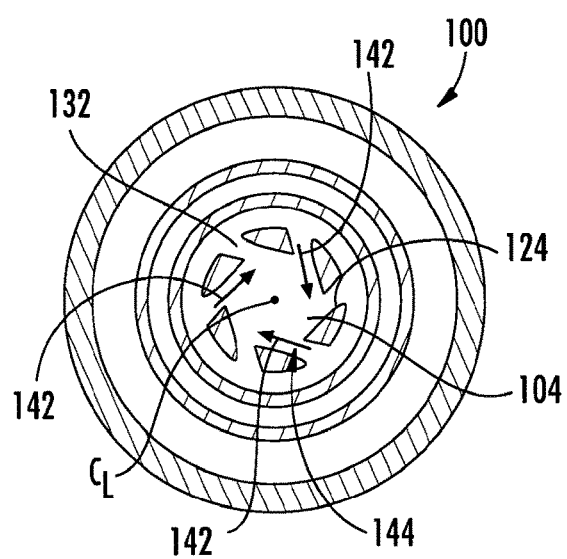
FIG. 8 is a cross sectional top view of the pre-film liquid fuel cartridge taken along line 8-8 as shown in FIG. 5, according to one embodiment of the present invention.

FIG. 8 is a cross sectional top view of the pre-film liquid fuel injection cartridge 100 taken along line 8-8 as shown in FIG. 5 detailing the plurality of water injection ports 132, according to one embodiment. As shown in FIGS. 5 and 8, the water injection ports 132 extend through the pre-filming surface 126 proximate to the upstream end portion 120. At least some of the water injection ports 132 are oriented to direct a spray or jet 142 of water 144 or other diluent from the water passage 104 onto the pre-filming surface 126. For example, in various embodiments, the water injection ports 132 are oriented tangentially with respect to at least one of the inner side 124, the axial centerline of the pre-film tip 118 and/or the centerline of the pre-mix liquid fuel cartridge 100 so as to induce swirl to the jet 142 of water 144 as it flows along the pre-filming surface 126. As a result, the jet 142 of water 144 has a circumferential, radial and axial velocity with respect to the axial centerline of the pre-film tip 118 that is based in part on the diameter and shape of the water injection ports 132 and the pressure within the water passage 104.

Figure 9:
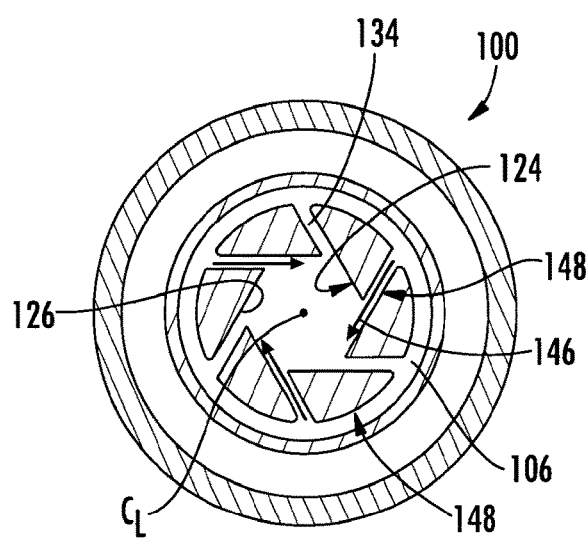
FIG. 9 is a cross sectional top view of the pre-film liquid fuel cartridge taken along line 9-9 as shown in FIG. 5, according to one embodiment of the present invention.

FIG. 9 is a cross sectional top view of the pre-film liquid fuel injection cartridge 100 taken along line 9-9 as show in FIG. 5 detailing the plurality of liquid fuel injection ports 134, according to one embodiment. As shown in FIGS. 5 and 9, the liquid fuel injection ports 134 extend through the pre-filming surface 126 downstream from the water injection ports 132. At least some of the liquid fuel injection ports 134 are oriented to direct a spray or jet 146 of liquid fuel 148 from the liquid fuel passage 106 onto the pre-filming surface 126. For example, in various embodiments, the liquid fuel injection ports 134 are oriented tangentially with respect to at least one of the inner side 124, the axial centerline of the pre-film tip 118 and/or the centerline of the pre-mix liquid fuel cartridge 100 so as to induce swirl to the jet 146 of liquid fuel 148 as it flows along the pre-filming surface 126. As a result, the jet 146 of liquid fuel 148 has a circumferential, radial and axial velocity with respect to the axial centerline of the pre-film tip 118 that is based in part on the diameter and shape of the liquid fuel injection ports 134 and the pressure within the liquid fuel passage 106. In particular embodiments, the circumferential, radial and axial velocity of the jet 142 of water 144 is less than or greater than the circumferential, radial and axial velocity of the jet 146 of the liquid fuel 148.

In particular embodiments, as shown in FIG. 4, the plurality of atomizing air injection ports 136 are axially oriented around the aft end portion 122 of the pre-film tip 118 with respect to the axial centerline of the pre-film tip 118 and/or the pre-mix liquid fuel cartridge 100. In one embodiment, the plurality of atomizing air injection ports 136 are axially oriented between the emulsion atomizing shear edge 128 and the atomizing air shear edge 130. As shown in FIGS. 4 and 6, at least one of the atomizing air injection ports 136 is oriented to direct a flow or jet 150 of compressed air 152 from the compressed air passage 108 downstream from the atomizing air shear edge 130 and/or the aft end portion 122 of the pre-film tip 118 towards the combustion chamber 52 (FIG. 2).

In one embodiment, at least some of the atomizing air injection ports 136 are oriented or angled with respect to the axial centerline of the pre-film tip 118 and/or the pre-mix liquid fuel cartridge 100 so as to induce swirl to the flow 150 of the compressed air 152 as it exits the atomizing air injection ports 136. As a result, the flow 150 of the compressed air 152 has a circumferential, radial and axial velocity with respect to the axial centerline of the pre-film tip 118 that is based in part on the diameter and shape of the atomizing air injection ports 136 and the pressure within the compressed air passage 108. In particular embodiments, the circumferential, radial and axial velocity of the flow 150 of the compressed air 152 is less than or greater than at least one of the circumferential, radial and axial velocity of the jet 142 of the water 144 and the jet 146 of the liquid fuel 148.

Figure 10:
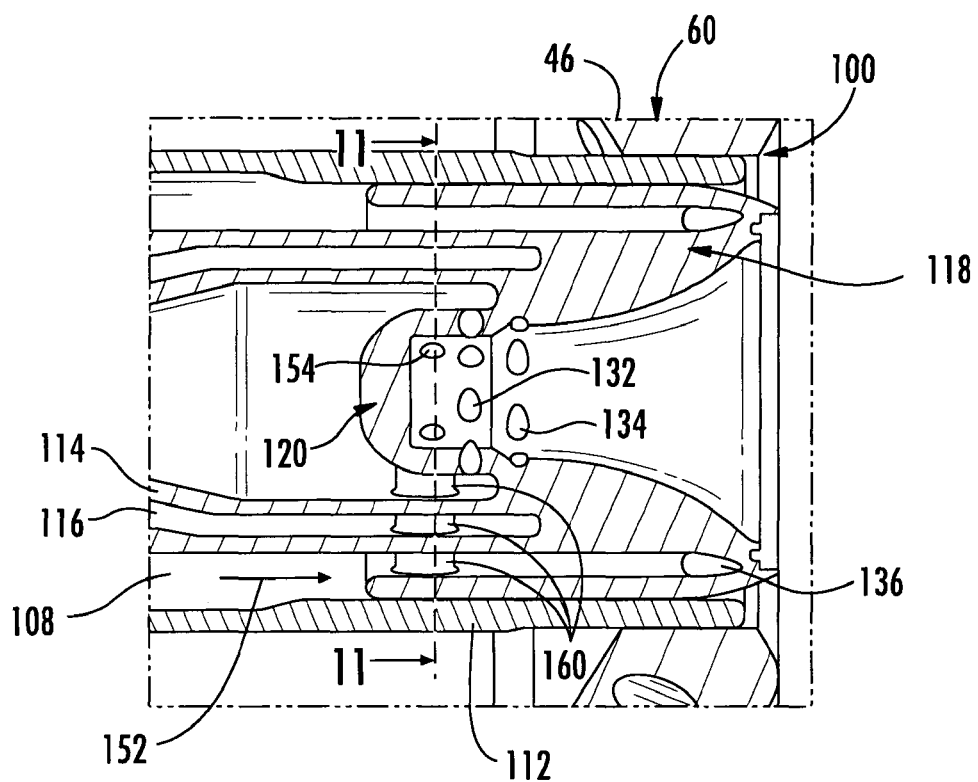
FIG. 10 is an enlarged cross sectional side view of the end portion of the fuel nozzle including the downstream end portion of the pre-film liquid fuel cartridge according to one embodiment of the present invention.

FIG. 10 is an enlarged cross sectional side view of the downstream end portion 60 of the fuel nozzle 46 including the downstream end portion 102 of the pre-film liquid fuel cartridge 100, according to one embodiment of the present invention. In one embodiment, as shown in FIG. 10, the pre-film tip 118 includes a plurality of upstream air injection ports 154 disposed upstream from the plurality of water injection ports 132 and/or upstream from the plurality of liquid fuel injection ports 134 and upstream from the atomizing air injection ports 136. In one embodiment the upstream air injection ports 154 are disposed upstream from the ledge or step 140.

Figure 11:
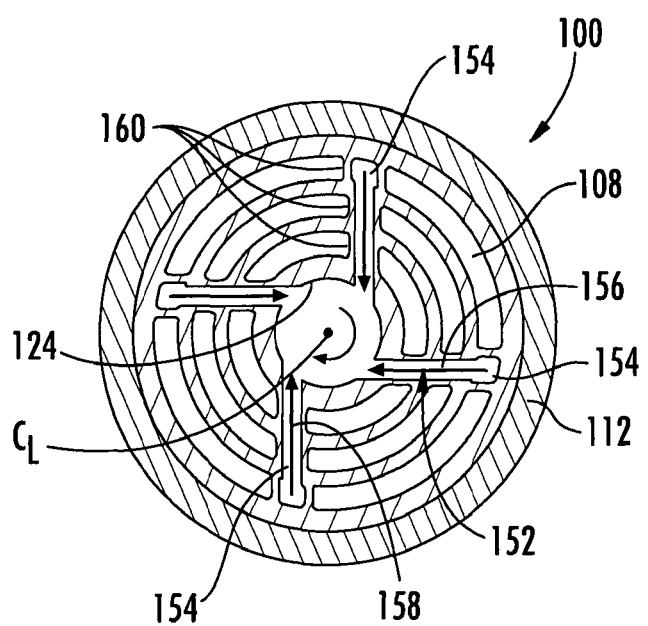
FIG. 11 is a cross sectional top view of the pre-film liquid fuel cartridge taken along line 11-11 as shown in FIG. 8, according to one embodiment of the present invention.

FIG. 11 is a cross sectional top view of the pre-film liquid fuel injection cartridge 100 taken at line 11-11 in FIG. 10, detailing the plurality of upstream air injection ports 154 according to one embodiment. As shown in FIGS. 10 and 11, the upstream air injection ports 154 extend through the pre-filming surface 126 upstream from the water injection ports 132. At least some of the upstream air injection ports 154 are oriented to direct an inner flow 156 of the compressed air 152 from the compressed air passage 108 or another compressed air source such as the high pressure plenum 42 onto the inner side 124 and/or the pre-filming surface 126. For example, in various embodiments, the upstream air injection ports 154 are oriented tangentially with respect to at least one of the inner side 124, the axial centerline of the pre-film tip 118 and/or the centerline of the pre-mix liquid fuel cartridge 100 so as to induce swirl to the inner flow 156 of the compressed air 152 as it flows along the pre-filming surface 126. As a result, the inner flow 156 of the compressed air 152 has a circumferential, radial and axial velocity with respect to the axial centerline of the pre-film tip 118 that is based in part on the diameter and shape of the upstream air injection ports 154 and the pressure within the compressed air passage 108 or another compressed air source.

In one embodiment, as shown in FIGS. 10 and 11 combined, the upstream air injection ports 154 are fluidly connected to the compressed air passage 108 via a flow passage 158 that is defined via a plurality of hollow struts 160 that extend between the outer tube 112, the intermediate tube 116 and the inner tube 114 to provide for fluid communication between the compressed air passage 108 and a corresponding one or more of the upstream air injection ports 154. In particular embodiments, the circumferential, radial and axial velocity of the inner flow 156 of the compressed air 152 from the upstream air injection ports 154 is less than or greater than at least one of the circumferential, radial and axial velocity of the jet 142 of the water 144, the jet 146 of the liquid fuel 148 and the flow 150 of the compressed air 152 from the atomizing air injection ports 136.

In operation, as illustrated in various embodiments in FIGS. 4-11, the water 144 is supplied to the water passage 104, the liquid fuel 148 is supplied to the liquid fuel passage 106 and the compressed air 152 is supplied to the compressed air passage 108. The jet 142 of the water 144 is directed onto the pre-filming surface 126 via the plurality of water injection ports 132. The jet 142 of water 144 has a first circumferential, radial and axial velocity as it flows along the pre-filming surface 126. The jet 146 of the liquid fuel 148 is directed onto the pre-filming surface 126 via the plurality of liquid fuel injection ports 134. The jet 146 of liquid fuel 148 has a second circumferential, radial and axial velocity as it flows along the pre-filming surface 126. In one embodiment, the jet 142 of water 144 flows over or across the ledge or step 140 upstream from the jet 146 of the liquid fuel 148, thus enhancing film formation between the water and the fuel along the pre-filming surface 126.

As the jet 142 of the water 144 and the jet 146 of liquid fuel 148 flow across and/or along the pre-filming surface 126, a quasi-emulsion 162 (FIG. 7) of the water 144 and the liquid fuel 148 is formed upstream from the emulsion atomizing shear edge 128. The quasi-emulsion 162 of the water 144 and the liquid fuel 148 is partially atomized as it flows across the emulsion atomizing shear edge 128. Further atomization is realized as the partially atomized quasi-emulsion of the water 144 and liquid fuel 148 intersects with the flow or jet 144 of the compressed air 146 flowing from the atomizing air injection ports 136. In one embodiment, the partially atomized quasi-emulsion and the compressed air 152 flow across the atomizing air shear edge 130, thus significantly enhancing further atomization of the quasi-emulsion 162 due to optimization of the size of the axial gap or offset 138 which is generally always greater than zero. The atomized quasi-emulsion reduces flame temperature within the combustion chamber 52 while using a reduced amount of water 146 that is provided at a lower water pressure than required for conventional technology, thus increasing overall efficiency of the gas turbine 10.

In another embodiment, the inner flow 156 of the compressed air 152 is directed onto the pre-filming surface 126 via the plurality of upstream air injection ports 154. The inner flow 156 of the compressed air 152 has a third circumferential, radial and axial velocity as it flows along the pre-filming surface 126. The inner flow 156 of the compressed air 152 may further enhance mixing of the jet 142 of the water 144 and the jet 146 of the liquid fuel 148 upstream from the emulsion atomizing shear edge 128 and/or the atomizing air injection ports 136.

The various embodiments provided herein, provide various technical advantages over existing pre-film liquid fuel cartridges. For example, because the jet 142 of water 144 and the jet 146 of the liquid fuel 148 each have a different circumferential, axial and radial velocity, individual or discrete films of each of the water 144 and the liquid fuel 148 form on the pre-filming surface 126 simultaneously. As a result, interaction between the two discrete films of the water 144 and the liquid fuel 148 generally occurs at the emulsion atomizing shear edge 128 of the pre-film tip 118. This provides higher quality atomization of the water 144 and liquid fuel 148 quasi-emulsion 162 with a reduced amount of water required to meet required or regulated NOx emission levels than conventional technologies. In addition, the water pressure required is less than conventional technologies, thus resulting in cost saving related to high pressure water pumps typically utilized.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A pre-film liquid fuel cartridge, comprising:
a main body;
a water passage defined within the main body;
a liquid fuel passage defined within the main body;
a compressed air passage defined within the main body;
a pre-film tip disposed at a downstream end portion of the pre-film liquid fuel cartridge, the pre-film tip having a forward end portion axially separated from an aft end portion and an inner side that extends therebetween, the inner side defining a pre-filming surface, wherein the pre-filming surface diverges radially outward from the forward end portion to the aft end portion with respect to an axial centerline of the pre-film tip and terminates at an emulsion atomizing shear edge; and
wherein the pre-film tip comprises:
a plurality of water injection ports oriented tangentially through the pre-filming surface proximate to the forward end portion and in fluid communication with the water passage;
a plurality of liquid fuel injection ports oriented tangentially through the pre-filming surface between the water injection ports and the emulsion atomizing shear edge and in fluid communication with the liquid fuel passage;
a plurality of atomizing air injection ports defined between the emulsion atomizing shear edge and an atomizing air shear edge disposed downstream from the emulsion atomizing shear edge, wherein the plurality of atomizing air injection ports is axially oriented about the axial centerline of the pre-film tip, wherein the plurality of atomizing air injection ports is in fluid communication with the compressed air passage.

2. The pre-film liquid fuel cartridge as in claim 1, wherein the pre-filming surface is arcuate.

3. The pre-film liquid fuel cartridge as in claim 1, wherein each water injection port of the plurality of water injection ports is oriented to direct a jet of water onto the pre-filming surface.

4. The pre-film liquid fuel cartridge as in claim 1, wherein at least one of the plurality of water injection ports is oriented to induce swirl to a corresponding jet of water.

5. The pre-film liquid fuel cartridge as in claim 1, wherein each liquid fuel injection port of the plurality of liquid fuel injection ports is oriented to direct a jet of liquid fuel onto the pre-filming surface.

6. The pre-film liquid fuel cartridge as in claim 1, wherein at least one of the plurality of liquid fuel injection ports is oriented to induce swirl to a corresponding jet of liquid fuel.

7. The pre-film liquid fuel cartridge as in claim 1, wherein the plurality of atomizing air injection ports is oriented to provide swirl to a flow of compressed air exiting the atomizing air injection ports.

8. The pre-film liquid fuel cartridge as in claim 1, further comprising a step that extends radially and circumferentially along the inner side of the pre-film tip downstream from the plurality of water injection ports.

9. A pre-film liquid fuel cartridge, comprising:
a water passage defined within a main body;
a liquid fuel passage defined within the main body radially outwardly from the water passage;
a compressed air passage defined within the main body radially outwardly from the liquid fuel passage;
a pre-film tip disposed at a downstream end portion of the pre-film liquid fuel cartridge, the pre-film tip having a forward end portion axially separated from an aft end portion and an inner side that extends therebetween, the inner side defining a pre-filming surface, wherein the pre-filming surface diverges radially outward from the forward end portion to the aft end portion with respect to an axial centerline of the pre-film tip and terminates at an emulsion atomizing shear edge; and
wherein the pre-film tip comprises:
a plurality of upstream air injection ports oriented tangentially through the pre-filming surface proximate to the forward end portion and in fluid communication with the compressed air passage;
a plurality of water injection ports oriented tangentially through the pre-filming surface downstream from the upstream air injection ports and in fluid communication with the water passage;
a plurality of liquid fuel injection ports oriented tangentially through the pre-filming surface between the water injection ports and the emulsion atomizing shear edge and in fluid communication with the liquid fuel passage;
a plurality of atomizing air injection ports defined between the emulsion atomizing shear edge and an atomizing air shear edge disposed downstream from the emulsion atomizing shear edge, wherein the plurality of atomizing air injection ports is axially oriented about the axial centerline of the pro-film tip, wherein the plurality of atomizing air injection ports is in fluid communication with the compressed air passage.

10. The pre-film liquid fuel cartridge as in claim 9, wherein each upstream air injection port of the plurality of upstream air injection ports is oriented to direct an inner flow of compressed air onto the pre-filming surface.

11. The pre-film liquid fuel cartridge as in claim 10, wherein at least one of the plurality of upstream air injection ports is oriented to induce swirl to a corresponding flow of a diluent.

12. The pre-film liquid fuel cartridge as in claim 9, wherein each water injection port of the plurality of water injection ports is oriented to direct a jet of water onto the pre-filming surface.

13. The pre-film liquid fuel cartridge as in claim 12, wherein at least one of the plurality of water injection ports is oriented to induce swirl to a corresponding jet of water.

14. The pre-film liquid fuel cartridge as in claim 9, wherein each liquid fuel injection port of the plurality of liquid fuel injection ports is oriented to direct a jet of liquid fuel onto the pre-filming surface.

15. The pre-film liquid fuel cartridge as in claim 14, wherein at least one of the plurality of liquid fuel injection ports is oriented to induce swirl to a corresponding jet of liquid fuel.

16. The pre-film liquid fuel cartridge as in claim 9, wherein the plurality of atomizing air injection ports is oriented to provide swirl to a flow of compressed air exiting the compressed air passage and wherein the emulsion atomizing shear edge is shaped to direct a quasi-emulsion of water, liquid fuel and compressed air into the flow of the compressed air from the plurality of atomizing air injection ports.

17. A gas turbine, comprising:
a compressor, a combustor disposed downstream from the compressor and a turbine disposed downstream from the combustor, the combustor including a fuel nozzle extending downstream from an end cover, the fuel nozzle defining a fuel cartridge passage;
a pre-film liquid fuel cartridge disposed within the fuel cartridge passage, the pre-film liquid fuel cartridge having a main body, a water passage defined within the main body, a liquid fuel passage defined within the main body, a compressed air passage defined within the main body and a pre-film tip disposed at a downstream portion of the pre-film liquid fuel cartridge proximate to an end portion of the fuel nozzle, the pre-film tip having a forward end portion axially separated from an aft end portion and an inner side that extends therebetween, the inner side defining an arcuate pre-filming surface, wherein the pre-filming surface diverges radially outward from the forward end portion to the aft end portion with respect to an axial centerline of the pre-film tip and terminates at an emulsion atomizing shear edge; and
wherein the pre-film tip comprises:
a plurality of water injection ports oriented tangentially through the pre-filming surface proximate to the forward end portion and in fluid communication with the water passage;
a plurality of liquid fuel injection ports oriented tangentially through the pre-filming surface between the water injection ports and the emulsion atomizing shear edge and in fluid communication with the liquid fuel passage; and
a plurality of atomizing air injection ports defined between the emulsion atomizing shear edge and an atomizing air shear edge disposed downstream from the emulsion atomizing shear edge, wherein the plurality of atomizing air injection ports is axially oriented about the axial centerline of the pre-film tip, wherein the plurality of atomizing air injection ports is in fluid communication with the compressed air passage.

18. The gas turbine as in claim 17, further comprising a plurality of upstream air injection ports oriented tangentially through the pre-filming surface proximate to the forward end portion and in fluid communication with the compressed air passage.

* * * * *